(12) United States Patent
Sillence et al.

(10) Patent No.: US 7,042,693 B2
(45) Date of Patent: May 9, 2006

(54) LIGHTNING PROTECTION APPARATUS AND METHOD

(75) Inventors: Colin David Sillence, Bristol (GB); Christopher Charles Rawlingson Jones, Lancashire (GB)

(73) Assignee: BAE Systems plc, Farnborough (GB)

( * ) Notice: Subject to any disclaimer, the term of this patent is extended or adjusted under 35 U.S.C. 154(b) by 284 days.

(21) Appl. No.: 10/089,182

(22) PCT Filed: Jan. 12, 2001

(86) PCT No.: PCT/GB01/00126

§ 371 (c)(1),
(2), (4) Date: Jul. 25, 2002

(87) PCT Pub. No.: WO01/54980

PCT Pub. Date: Aug. 2, 2001

(65) Prior Publication Data

US 2003/0021076 A1 Jan. 30, 2003

(30) Foreign Application Priority Data

Jan. 25, 2000 (GB) .................................... 0001549

(51) Int. Cl.
*H05F 3/00* (2006.01)

(52) U.S. Cl. ........................ 361/212; 361/218
(58) Field of Classification Search ................ 361/212, 361/213, 216–218, 225, 226, 228, 229
See application file for complete search history.

(56) References Cited

U.S. PATENT DOCUMENTS

| 2,578,698 A | | 12/1951 | Hanford ........................ 260/450 |
| 2,982,494 A | | 5/1961 | Amason ........................ 244/1 |
| 3,719,867 A | * | 3/1973 | Meier ........................... 361/121 |
| 3,906,308 A | * | 9/1975 | Amason et al. ............... 361/218 |
| 4,156,182 A | * | 5/1979 | Brick et al. .................... 324/72 |
| 4,224,655 A | * | 9/1980 | Loncaric ....................... 361/215 |
| 4,323,946 A | | 4/1982 | Traux ........................... 361/218 |
| 4,886,221 A | * | 12/1989 | Honigsbaum ................ 244/1 A |
| 5,074,495 A | * | 12/1991 | Raymond ...................... 244/78 |
| 5,208,724 A | | 5/1993 | Honigsbaum ................ 261/218 |
| 5,862,032 A | * | 1/1999 | Cann ............................ 361/217 |
| 6,072,684 A | * | 6/2000 | Eybert-Berard et al. ..... 361/212 |

FOREIGN PATENT DOCUMENTS

FR        2 675 767        4/1923

* cited by examiner

*Primary Examiner*—Brian Sircus
*Assistant Examiner*—Danny Nguyen
(74) *Attorney, Agent, or Firm*—Crowell & Moring LLP

(57) ABSTRACT

A deployable lightning protection apparatus particularly suited for use with an aircraft radome comprises a source of electrically conducting fluid, a deliver apparatus which delivers the conducting fluid flow across to the surface of the radome prior to a lightning strike; and a control unit for controlling the delivery apparatus. The conducting fluid across the outer surface of the radome provides a conductive path for the passage of electrical current resulting from a lightning strike and dissipating said current without damage to the radome. The apparatus allows lightning protection to be deployed in response to a change in atmospheric conditions indicative of a high probability of lightning strike and removed when the danger of lightning strike has passed.

13 Claims, 3 Drawing Sheets

LIGHTNING PROTECTION APPARATUS AND METHOD

This invention relates to lightning protection apparatus and in particular but not limited to lightning protection apparatus for radomes, and similar devices.

BACKGROUND OF THE INVENTION

It is well known that electric fields distort around sharp points causing a concentration of field strength about such points. As a result, sharp extremities on tall buildings and air borne vehicles are particularly prone to being struck by lightning in a storm. This is a particular problem for aircraft which, in order to be more aerodynamic, often incorporate sharply radiused projections. One example of such a sharply radiused projection is the radome which is generally fitted to the nose of an aircraft.

The radome generally carries the radar system and other electro-magnetically sensitive equipment and is by necessity made from a dielectric material, consequently a lightning strike to the radome can result in disintegration of the radome and subsequent in loss of the aircraft through aerodynamic instability. Thus, aircraft are provided with lightning protection systems to limit the damage which may be caused in the event of a lightning strike to the radome.

Conventional protection systems are known as lightning diverters. These generally consist of metal strips extending from the tip of the radome, across its external surface and back towards the metal airframe of the aircraft. When lightning strikes the radome, the current is carried by the conducting strips to the metal airframe where higher current densities can be safely dissipated. More recent variations comprise what is known as a button strip. This consists of a row of closely spaced metal dots carried on a strip of dielectric material. Just prior to a lightning strike, the atmospheric electric charge surrounding the aircraft builds, the dielectric begins to ionise, thus initiating the electrostatic ionisation of surrounding air molecules. The metal dots increase their local field strength and form a plasma thus providing a conductive channel for conducting the current induced by the lightning.

During lightning strike the small quantities of metals used in these conductors are subject to extreme temperatures and electro-dynamic forces which tend to cause them to ablate. As a consequence, these systems have a "one strike" capability and must be replaced on landing.

SUMMARY OF THE INVENTION

A further problem with these conventional technologies is that they require the presence of metal on the radome at all times, irrespective of atmospheric conditions. The conductive properties of this metal can cause serious aberration of radar system radiation patterns, with consequent degradation in the system's performance.

The present invention provides a lightning protection apparatus for a radome comprising;

a source of electrically conducting fluid;

a delivery means for delivering the conducting fluid to the surface of the radome prior to a lightning strike;

a control means for controlling the delivery system; and means for directing the conducting fluid across the outer surface of the radome thereby providing a conductive channel for the passage of electrical current resulting from a lightning strike and dissipating said current without damage to the radome.

The provision of the electrically conductive medium in a fluid form permits a flexible system whereby the lightning conductive element can be deployed as and when atmospheric conditions are such that there is a significant risk that lightning may strike. The control means monitors the atmospheric condition and initiates delivery of the conductive fluid through the delivery means to the surface of the radome when a change indicative of a high probability lightning strike is detected.

Airflow over the radome surface during flight is sufficient to carry the conductive fluid across the radome surface and direct it towards the airframe thus providing a channel for conducting any current induced by a lightning strike to the airframe for dissipation. When conditions are such that there is no significant danger of lightning strike, the conductive fluid can be removed from the radome surface. When lightning protection is not needed, the conductive fluid can be stored in an insulating container thereby removing the conductive interference from the radar system and any consequent degradation of radar performance.

The control means will generally comprise a series of sensors for detecting changes in the atmosphere associated with imminent lightning. These sensors may detect factors such as changes in light levels, temperature, humidity and the like but most preferably detect changes in electrostatic field strength. Preferably, threshold sensors are also incorporated into the control means for recognising when the field strength has exceeded a predetermined level indicative of a high probability of lightning strike. The control means may additionally incorporate software for controlling the delivery and removal of the fluid. Typically, a predetermined threshold level would be in the region of 1000 volts per meter.

In some circumstances, aircraft are known to accumulate electrostatic charge in the course of flight in relatively stable weather conditions. In these circumstances the polarity of the E-field over the entire surface of the aircraft will be the same (i.e. either directed outward from the surface, or inward towards the surface at all points). In a high probability of lightning strike atmosphere, the polarity of the E-field at the aircraft surface will vary over the surface, being outward in some regions, and inward in others. Thus, in order to better discriminate high probability lightning strike conditions from strong E-fields due to other phenomena, it is preferred that the control means incorporate a means for detecting localised polarity of E-fields at the aircraft surface.

In some embodiments of the invention, this is achieved by providing a plurality of polarity sensitive electrostatic field sensors located at diverse positions on the aircraft surface, preferably in a circumferential spatial arrangement about the longitudinal axis of the radome. It is advantageous to sample the field at surfaces facing upward, downward, left, right, forward and backward. Suitable electrostatic and polarity sensitive sensors include integrated optics E-field sensors such as those which utilise Pockel's or Kerr's electro-optical effects in materials such as Lithium Niobate. A logic circuit is also incorporated which is configured to recognise a condition where at least one electrostatic sensor detects a field amplitude which exceeds the predetermined threshold level and the polarity of the field detected by each of the plurality of electrostatic field sensors is not the same. When this condition is recognised, the logic circuit activates the delivery system by any suitable switching mechanism.

Whilst airflow is sufficient to direct the conductive fluid across the radome, it may be preferable to provide some form of guide in the surface of the radome to enable the conductive fluid to travel consistently in the same path. Such a guide may conveniently be provided in the form of a shallow groove on the surface of the radome.

Once the threat of a lightning strike has passed, it is desirable to remove the conductive channel from the radome surface. Again, once the delivery means has ceased delivery of the fluid, air flow can be used to remove the fluid from the surface. Preferably, the apparatus will comprise features specifically designed to remove the fluid. In one option, such a feature may comprise a source of clean carrier liquid and means for flushing the clean carrier liquid through the delivery system and over the conductive channel thereby removing the conductive channel. The control means can be configured to recognise changes in the surrounding atmosphere indicative of a reversion from a high probability of lightning strike condition back to a normal condition.

The delivery means itself may comprise any suitable form but conveniently comprises two or more dialectric capillary tubes which vent close to the tip of the radome and a pump and valve arrangement associated with a reservoir of the conducting fluid for pumping fluid into the capillary tubes. The delivery system is conveniently operated by a pneumatic or hydraulic system and should be electrically and spatially isolated from the conducting airframes or anything electrically connected to it, in order to prevent lightning striking the aircraft via a path inside the radome. This may conveniently be achieved by operation via a pneumatic or hydraulic system, employing non-electrically conducting pipes and fluids. Alternatively, the delivery means may be operated by electric pump and valve means powered by a local battery and the control means comprises a signalling circuit of optical fibres.

Where a pump is used to deliver the conductive fluid, the pump may have a reversible action so that the fluid can be withdrawn back into the reservoir when the threat of lightning is removed.

Suitable fluids for use as the conductive fluid include any dielectric carrier loaded with conducting particles. For example distilled water carrying carbon particles. Additives which may optionally be added to improve performance include, wetting agents, anti-blockage agents which separate particles to prevent blockage of delivery tubes and orifices, additives for reducing the evaporation temperature or rate of evaporation of the fluid and anti-static or anti-cling agents to minimise adherence of conductive particles after delivery. Alternative fluids include conductive gases or particulates of conductive material such as mercury vapour or carbon smoke.

In another aspect, the present invention provides a method for conducting lightning across the surface of a non-conducting article comprising;

providing a source of electrically conducting fluid;

delivering the conducting fluid to the surface of the article prior to a lightning strike; and directing the conducting fluid across the outer surface of the article thereby providing a conductive channel for the passage of electrical current resulting from a lightning strike and dissipating said current through a conductive medium.

Other objects, advantages and novel features of the present invention will become apparent from the following detailed description of the invention when considered in conjunction with the accompanying drawings.

DETAILED DESCRIPTION OF THE INVENTION

Figure 1:
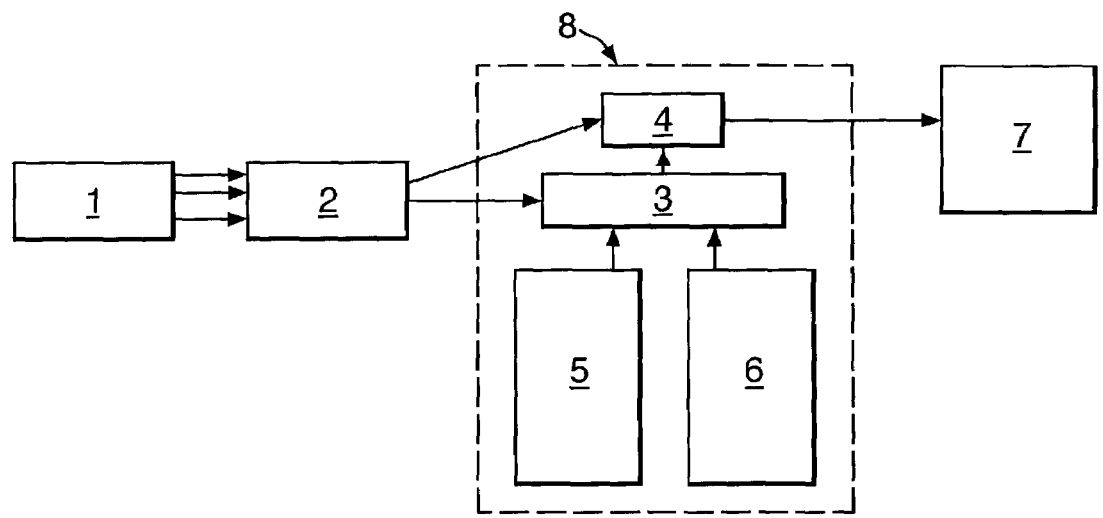
FIG. 1 shows a schematic flow chart of one embodiment of the inventive system.

As can be seen from FIG. 1, a system of electrostatic sensors indicated generally by reference numeral 1 provide input to a control system 2 which comprises a threshold sensor and a simple logic circuit. When the logic circuit detects conditions indicative of a high probability of lightning strike, it communicates this to the pump 4 and valves 3 of the delivery system 7, 8. Conducting fluid from a reservoir 5 is transported through valve means 3 and pump 4 to a system of capillary tubes 7 which vent at various points near the tip of the radome. On deployment of the conducting fluid, as the aircraft is in flight, airflow drags the delivered conducting fluid in a direction opposing the direction of travel of the aircraft across the radome surface and towards the metal airframe.

In the particular embodiment shown, a second reservoir 6 of clean carrier fluid is provided. The control system is configured to detect a reversing of conditions to below the threshold value. When this condition is recognised the control system communicates this to the valves 3 which switch to allow release of the clean carrier fluid over the radome surface thereby removing the conductive path. To prevent lightning current being conducted internally to the radome, the conductive fluid reservoir 5, valves 3 and pump 4 are encased in a dielectric container 8, the capillary tubes 7 are also made from an insulating material.

Figure 2:
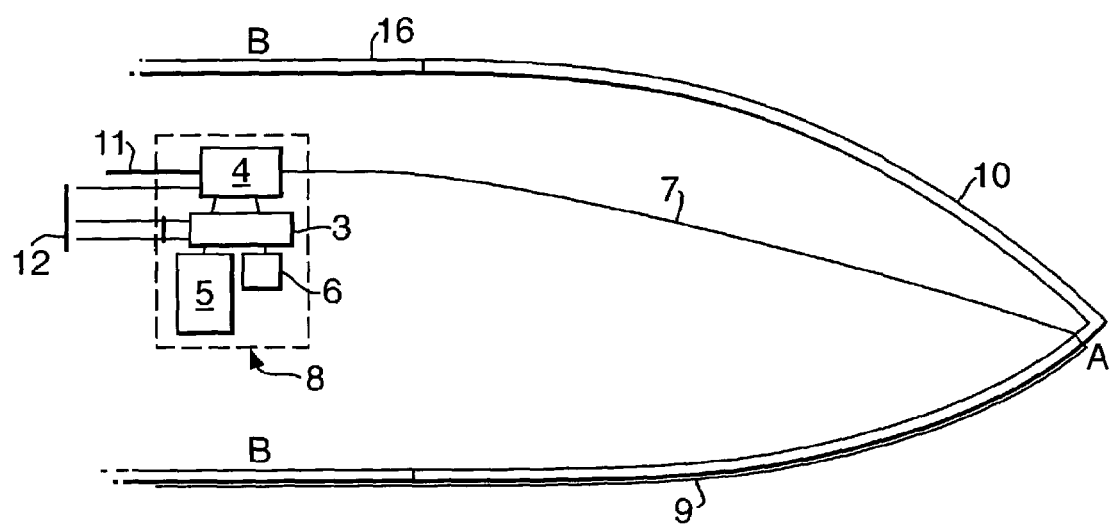
FIG. 2 illustrates a pneumatically operated embodiment of the invention.

FIG. 2 illustrates an embodiment similar to that of FIG. 1 incorporated into the nose portion of an aircraft. As can be seen from the Figure, a capillary tube 7 vents at a point A near to the tip of the radar transparent radome 10 of the aircraft. When a high probability of lightning strike is detected, the conductive fluid is pumped from the reservoir 5 via the valves 3 and pump 4 to the capillary tube 7 which is one of a number of similar tubes. Due to the geometry of the aircraft nose cone and airflow during flight, the fluid travels along the bottom surface of the radome towards the metal airframe 16 creating a conductive channel 9 leading from the tip of the radome A to a point B on the conductive airframe 16. A supply of pressurised air is provided via a dielectric pipe 11 to drive the pneumatic pump 4. Additional dielectric pipe work 12 carry hydraulic or pneumatic fluid controlled by the logic circuit to activate the delivery system when a high probability of lightning strike is detected.

Figure 3:
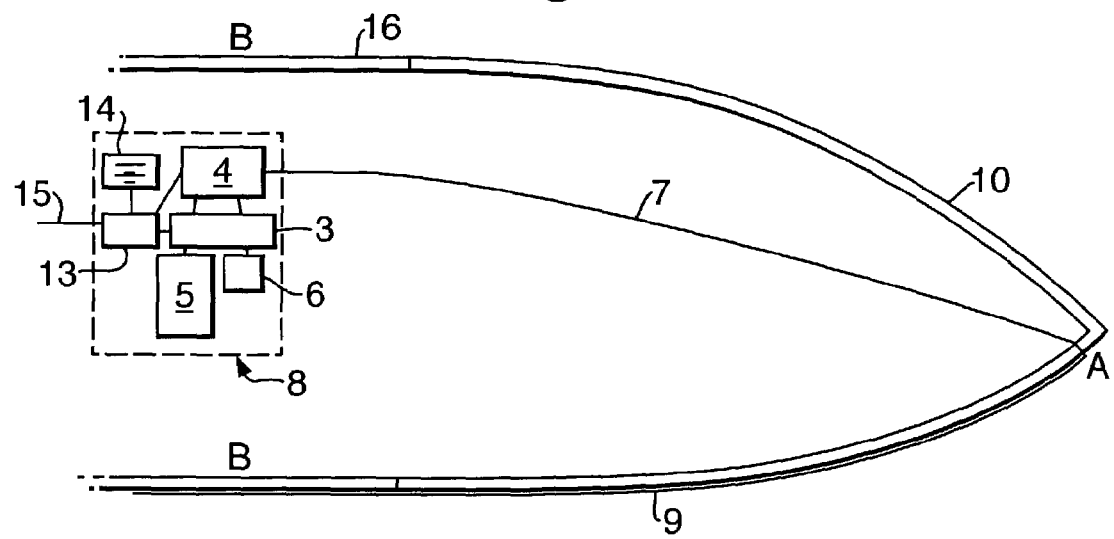
FIG. 3 illustrates an electrically operated embodiment of the invention.

The embodiment shown in FIG. 3 operates in essentially the same manner as that described in relation to FIG. 2, however, in this embodiment, the control system is operated by opto-electric rather than hydraulic and pneumatic means. A battery 14, contained in dielectric container 8 powers the pump 4 and valves 3. Information from and to the logic circuit is relayed via signals through optical fibres 15.

Figure 4:
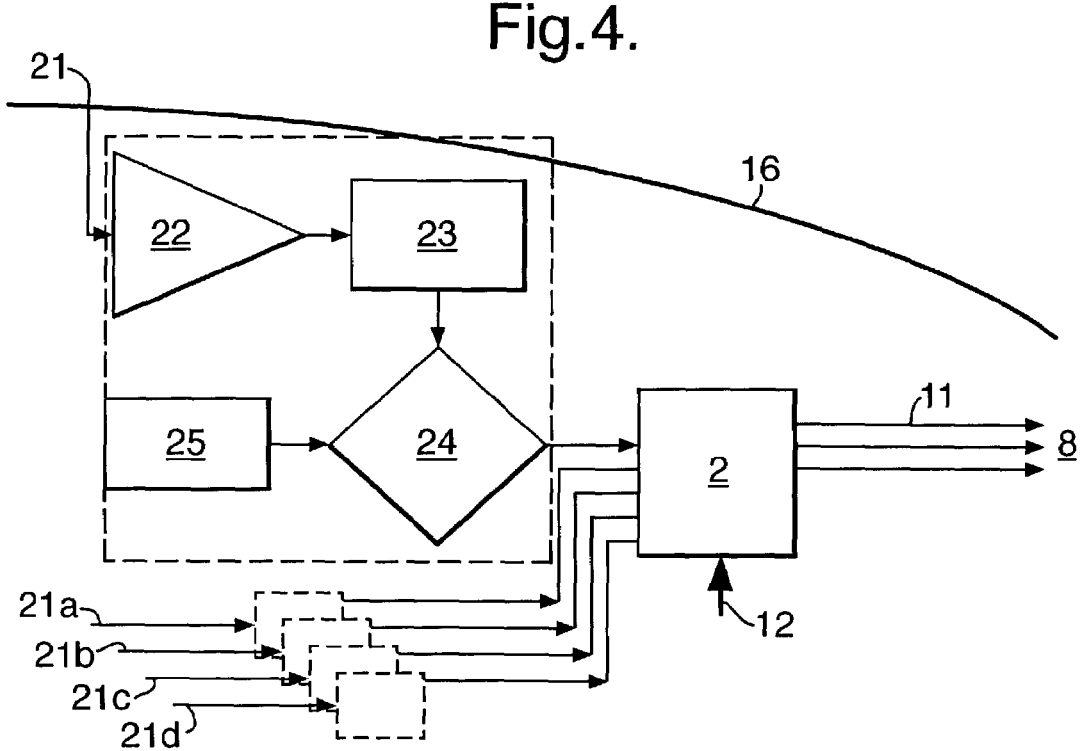
FIG. 4 illustrates the control system for the embodiment of FIG. 2.
Figure 5:
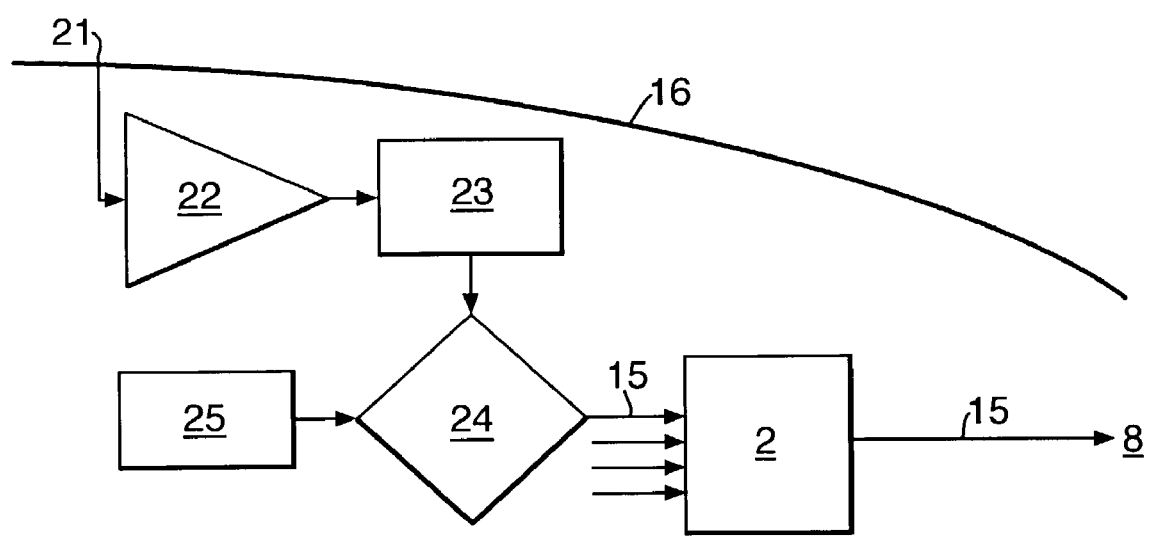
FIG. 5 illustrates the control system for the embodiment of FIG. 3.

FIGS. 4 and 5 show the basic circuitry for the sensor system. FIG. 4 relates to the embodiment shown in FIG. 2 and FIG. 5 relates to the embodiment shown in FIG. 3. An E-field sensor 21 detects a charge in the surrounding E-field and relays a signal to an amplifier 22. The signal is processed through a low pass filter 23 and to a comparator 24 where it is compared against a voltage reference 25. Preferably the comparator circuit incorporates a polarity identifier. Simultaneously other signals are relayed by other sensors 21*a*, 21*b*, 21*c*, 21*d* through similar circuits. The comparators 24 relay the signal to the threshold detector 2 and logic circuit for processing.

Whilst the foregoing embodiments describe the invention for use in relation to a radome on an aircraft, the skilled person will understand that the invention is not limited to these embodiments. The basic principle behind the invention, that is, the use of a deployable fluid conductor in place of a permanent solid conductor, may be used to replace conventional lightning conductors in numerous other applications.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lightning protection apparatus for a radome attached to an airframe comprising:
   a source of electrically conducting fluid;
   a delivery means for delivering the conducting fluid to a surface of a radome on which the protection apparatus is installed, prior to the lightning strike;
   a control means for controlling the delivery means, said control means having
      at least one electrostatic field sensor for detecting a change in surrounding atmospheric conditions indicative of a high probability of a lightning strike; and
      means for initiating delivery of the conducting fluid on detection of such a change in atmospheric conditions, comprising a threshold detector for detecting when an electrostatic field amplitude detected by the at least one electrostatic field sensor exceeds a predetermined threshold level, and a switch for activating the delivery means when the predetermined threshold level is exceeded; and
   means for directing the conducting fluid across the radome surface on which the protection apparatus is installed, towards the airframe, thereby providing a channel having a current conducting capacity sufficient for conducting any current induced by a lightning strike to the airframe for dissipation without damage to the radome.

2. A lightning protection apparatus for a radome as claimed in claim 1, wherein:
   a plurality of polarity sensitive electrostatic field sensors are provided in a circumferential spatial arrangement about the longitudinal axis of the radome; and
   the means for initiating delivery comprises a logic circuit configured to recognize a condition where at least one electrostatic sensor detects a field amplitude which exceeds the predetermined threshold level and the polarity of the field detected by each of the plurality of electrostatic field sensors is not the same, the switch being activated by the logic circuit only when both these conditions are met.

3. A lightning protection apparatus for a radome as claimed in claim 1, wherein the predetermined threshold level is approximately 1000 volts per meter.

4. A lightning protection apparatus for a radome as claimed in claim 1, wherein the means for directing the conducting fluid across the outer surface of the radome comprises grooves on the surface of the radome.

5. A lightning protection apparatus for a radome as claimed in claim 1, further comprising means for deactivating the conductive channel when the surround atmospheric conditions are no longer indicative of a high probability lightning strike.

6. A lightning protection apparatus for a radome as claimed in claim 5, wherein the means for deactivating the conductive channel comprises:
   a source of clean carrier liquid; and
   means for flushing the clean carrier liquid through the delivery system and over the conductive channel, thereby removing the conductive channel.

7. A lightning protection apparatus for a radome as claimed in claim 1, wherein the delivery system comprises:
   at least two dielectric capillary tubes which vent close to the tip of the radome; and
   a pump associated with a reservoir of the conducting fluid.

8. A lightning protection apparatus for a radome as claimed in claim 1, wherein the delivery system comprises a pneumatic or hydraulic system in which all control lines are dielectric and the pneumatic or hydraulic fluid used is not electrically conducting.

9. A lightning protection apparatus for a radome as claimed in claim 1, wherein:
   the delivery means comprises an electric pump and a valve powered by a battery; and
   the control means comprises a signalling circuit of optical fibres.

10. A lightning protection apparatus for a radome as claimed in claim 7, wherein the pump has a forward action for delivering the conductive fluid to the surface of the radome and a reverse action for withdrawing it from the surface of the radome.

11. A method for conducting lightning across a surface of a radome comprising:
    providing a source of electrically conducting fluid;
    delivering the conducting fluid to the surface of the radome in response to detection of a change in surrounding atmospheric conditions indicative of a high probability lightning strike; and
    directing the conducting fluid across an outer surface of the radome, thereby providing a conductive channel having a current conducting capacity sufficient for passage of electrical current resulting from a lightning strike and for dissipating said current through an object to which the radome is attached.

12. A method for conducting lightning across the surface of a non-conducting article comprising:
    providing a source of electrically conducting fluid;
    delivering the conducting fluid to an outer surface of the article prior to a lightning strike; and
    directing the conducting fluid across the outer surface of the article, thereby providing a conductive channel having a current conducting capacity sufficient for passage of electrical current resulting from a lightning strike and for dissipating said current through a conductive medium to which the article is electrically coupled.

13. Radome apparatus for an aircraft, comprising:
    a radome made of a nonconducting material, for mounting on an aircraft body; and
    first means for providing a conducting path having a current carrying capacity sufficient for conducting electricity from a lightning strike that impinges on said radome, to said aircraft body; said first means comprising, a source of electrically conducting fluid;

a delivery means for delivering the conducting fluid to a surface of a radome on which the protection apparatus is installed, prior to the lightning strike;

a control means for controlling the delivery means, said control means having at least one electrostatic field sensor for detecting a change in surrounding atmospheric conditions indicative of a high probability of a lightning strike; and means for initiating delivery of the conducting fluid on detection of such a change in atmospheric conditions, comprising a threshold detector for detecting when an electrostatic field amplitude detected by the at least one electrostatic field sensor exceeds a predetermined threshold level, and a switch for activating the delivery means when the predetermined threshold level is exceeded; and means for directing the conducting fluid across a surface of the radome toward said aircraft body, thereby providing a flow of said conducting fluid which forms said conducting path.

* * * * *